(12) United States Patent
Johansson et al.

(10) Patent No.: US 6,523,645 B1
(45) Date of Patent: Feb. 25, 2003

(54) PUMPING DEVICE FOR LUBRICATION OF SAW CHAIN

(75) Inventors: Jorgen Johansson, Jonkoping (SE); Par Martinsson, Jonkoping (SE)

(73) Assignee: Aktiebolagel Electrolux, Stockholm (SE)

( * ) Notice: Subject to any disclaimer, the term of this patent is extended or adjusted under 35 U.S.C. 154(b) by 0 days.

(21) Appl. No.: 09/646,976

(22) PCT Filed: Mar. 23, 1999

(86) PCT No.: PCT/SE99/00449

§ 371 (c)(1),
(2), (4) Date: Dec. 8, 2000

(87) PCT Pub. No.: WO99/48654

PCT Pub. Date: Sep. 30, 1999

(30) Foreign Application Priority Data

Mar. 26, 1998 (SE) .............................................. 9801022

(51) Int. Cl.[7] .............................. F16N 7/38; F16H 1/16
(52) U.S. Cl. ........................ 184/26; 74/89.14; 74/425; 74/458
(58) Field of Search ........................ 184/26, 27.1, 32, 184/33; 74/425, 89.14, 458

(56) References Cited

U.S. PATENT DOCUMENTS

| | | | | |
|---|---|---|---|---|
| 3,049,936 A | * | 8/1962 | Schnell | 74/425 |
| 3,067,627 A | * | 12/1962 | Pickles | 74/425 |
| 3,268,268 A | * | 8/1966 | Schwalm | 74/425 |
| 3,369,420 A | * | 2/1968 | Spyra | 74/425 |
| 3,797,326 A | * | 3/1974 | Conlee | 74/425 |
| 3,808,905 A | * | 5/1974 | Metzinger | 74/425 |
| 4,568,985 A | * | 2/1986 | Lindberg | 358/293 |
| 4,636,147 A | * | 1/1987 | Schweitzer et al. | 184/15.1 |
| 4,678,411 A | * | 7/1987 | Wieland | 417/500 |
| 4,801,253 A | * | 1/1989 | Johansson | 184/33 |
| 4,813,139 A | * | 3/1989 | Nagashima | 30/123.4 |
| 4,893,407 A | * | 1/1990 | Lane | 30/123.4 |
| 5,032,067 A | * | 7/1991 | Progl | 184/33 |
| 5,090,266 A | * | 2/1992 | Otsuka | 74/425 |
| 5,184,403 A | * | 2/1993 | Schliemann | 30/123.4 |
| 5,236,314 A | * | 8/1993 | Nagashima | 184/33 |
| 5,426,417 A | * | 6/1995 | Stanuch | 340/473 |
| 5,829,395 A | * | 11/1998 | Brenny et al. | 123/73 AD |

FOREIGN PATENT DOCUMENTS

DE 3411396 A1 * 10/1985 ............ B23P/15/14

* cited by examiner

*Primary Examiner*—Chong H. Kim
(74) *Attorney, Agent, or Firm*—Pearne & Gordon LLP

(57) ABSTRACT

A pumping device in connection with saw chain lubrication, especially in connection with a hand-held device, e.g. a chain saw, the pumping device including a pumping house, a piston that is received in the pumping house and means to bring the piston to rotate and simultaneously perform a reciprocating motion in its longitudinal direction, the means including on one hand a worm pinion having means for driving cooperation with a prime mover and on the other hand a gear pinion mounted on the piston. The invention further relates to a worm pinion, preferably included in a device for saw chain lubrication. The invention is characterized in that the worm gear on one hand includes a spirally shaped element, prefabricated as a separate detail, and intended to cooperate with the gear pinion and on the other hand a sleeve shaped element that supports the spirally shaped element.

5 Claims, 4 Drawing Sheets

PUMPING DEVICE FOR LUBRICATION OF SAW CHAIN

BACKGROUND OF THE INVENTION

1. Technical Field of the Invention

The present invention relates to a device for saw chain lubrication, especially in connection with a hand-held device, e.g. a chain saw, said device including a pump that in its turn includes a pumping house, a piston that is received in the pumping house and means to bring the piston to rotate and simultaneously perform a reciprocating motion in the longitudinal direction of the piston, said means including on one hand a worm pinion having means for driving cooperation with a prime mover and on the other hand and a gear pinion mounted on the piston. The invention also relates to a worm pinion, preferably included in a device for saw chain lubrication.

2. Prior Art

As regards the pumping device that is to supply lubricant to the chain of a chain saw, said device can either be driven directly by the crank shaft or driven by the clutch drum mounted on the crankshaft.

In case the pending pumping device is driven by the crankshaft, said pumping device will be activated, i.e. pumping lubricant, as soon as the engine of the chain saw is running, i.e. the pumping device will be activated also during idling mode of the chain saw. In connection with this principal solution it is previously known to provide a worm pinion on the crankshaft by attaching a spirally wound spring wire on the crankshaft, said spring wire being fixed on the crankshaft by for instance a clamping joint.

Out of consideration for the environment the pumping device for supplying lubricant has been mounted on the clutch drum. This means that the pumping device is activated only when the chain is driven, i.e. the pumping device is not activated during idling mode of the chain saw.

It is previously known to mount a worm pinion of plastic on the clutch drum, said worm pinion cooperating with a gear pinion of metal that is mounted on the piston of the pumping device.

It is also previously known to mount a worm pinion of metal on the clutch drum, said worm pinion cooperating with a gear pinion of plastic that is mounted on the piston of the pumping device.

For strength reasons it has turned out to be necessary that at least one of the cooperating pinions is manufactured from a wear resistant material, preferably metal.

SUMMARY OF THE INVENTION

A primary object of the present invention is to provide a device of the type mentioned above, said device having cooperating components that are cheap to manufacture and still provide a reliable availability performance.

A further object of the invention is that the materials of the components included in the device are selected depending on the function that said component is to perform.

A further object of the invention is that the structure and function of the device pays attention to the environment.

At least the primary object of the present invention is realized by means of a pumping device (1) in connection with saw chain lubrication, in connection with a hand-held chain saw, said pumping device (1) including a pumping house (7), a piston (9) that is received in the pumping house (7) and means (3, 10, 11, 12) to bring the piston (9) to rotate and simultaneously perform a reciprocating motion in its longitudinal direction, said means including on one hand a worm pinion (3) having means (25) for driving cooperation with a prime mover (15, 19) and on the other hand a gear pinion (10) mounted on the piston (9), characterized in that said worm gear (3) on one hand includes a spirally shaped element (28) that is prefabricated as a separate detail and intended to cooperate with the gear pinion (10), and on the other hand a sleeve shaped element (18) that supports the spirally shaped element (28), and that the spirally shaped element (28) is manufactured from a metal, and that the sleeve shaped element (18) and the teeth of the pinion (10) are manufactured form a polymer material.

BRIEF DESCRIPTION OF THE DRAWINGS

Below an embodiment of the invention will be described with reference to the accompanying drawings, where the figures show.

Detailed Description of an Embodiment of the Invention

Figure 1:
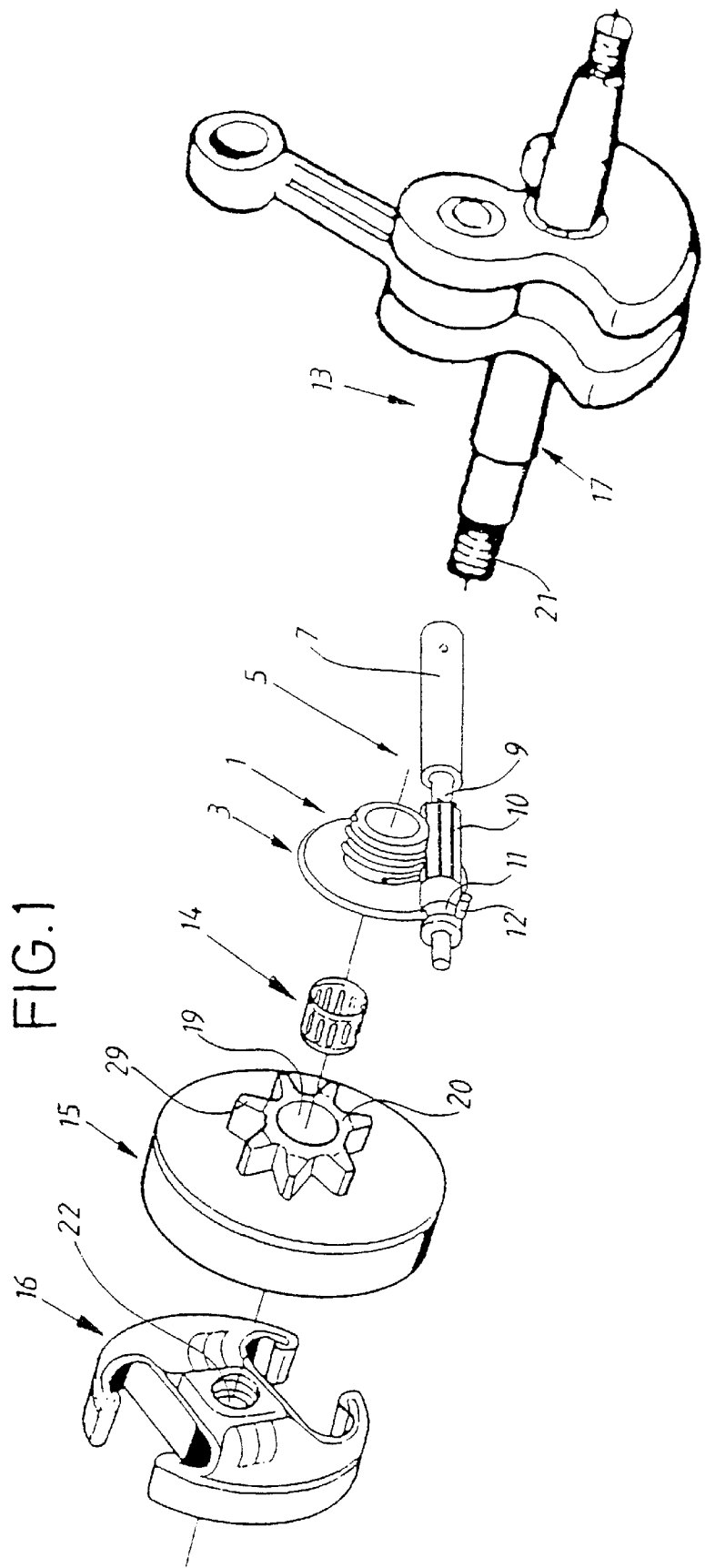
FIG. 1 shows an exploded view in perspective of the components included in the device according to the invention and further cooperating/connecting components.

In the exploded view according to FIG. 1 a pumping device 1 according to the invention is schematically shown, said device 1 being adapted for supplying lubricant, usually oil, to the chain of a chain saw. The pumping device 1 includes a worm pinion 3 and a pump 5, that in its turn includes a pumping house 7 and a piston 9, that reciprocates in the pumping house 7.

At is evident from FIG. 1 a gear pinion 10 is mounted on the piston 9, according to the invention said gear pinion 10 is manufactured from a plastic material according to prior art. At its end remote from the pumping house 7 the gear pinion 10 has a tangential groove 11, said groove having such a known configuration that the distance between the groove 11 and the pumping house 7 varies along the circumference of the groove 11. The groove 11 is adapted to cooperate with a stationary pin 12, i.e. a pin 12 that is mounted on a stationary part of the chain saw. How this configuration of the groove 11 affects the function of the pumping device will be described below.

In FIG. 1 a crankshaft 13, a needle roller bearing 14, a clutch drum 15 and a clutch 16 is also shown. The pumping device 1 is intended to be mounted on the shaft extension 17 that the faces the pumping device 1 in FIG. 1. Thereby, the bearing sleeve 18 of the worm pinion 3 is received directly on the shaft extension 17 without any intermediate, separate bearing means. The clutch drum 15 is likewise received or the shaft extension 17, said needle roller bearing 14 being attached between the bearing sleeve 19 of the clutch drum 15 and the shaft extension 17. At the outer side of the bearing sleeve 19 the clutch drum 15 is provided with a spigot 20, said spigot 20 having splines and being intended to cooperate with a recess at the side of the worm pinion 3 that faces the clutch drum 15. Said recess will be described more in detail below in connection with FIG. 2. In connection with the spigot 20 supports surfaces 29 are arranged in astral configuration, said supports surfaces 29 extending radially outside the spigot 20 and being intended to constitute support for the end of the worm pinion 3 that faces the clutch drum 15.

At the threaded end 21 of the shaft extension 17 the clutch 16 is received via a threaded central hole 22, said clutch 16 in a known way being located within the clutch drum 15.

Figure 2:
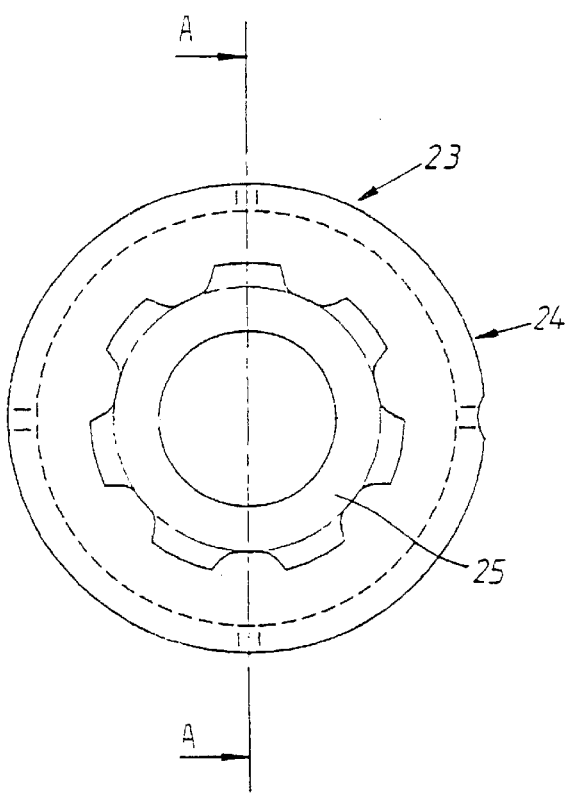
FIG. 2 an end view of an embodiment of a blank for a worm pinion according to the present invention.
Figure 4:
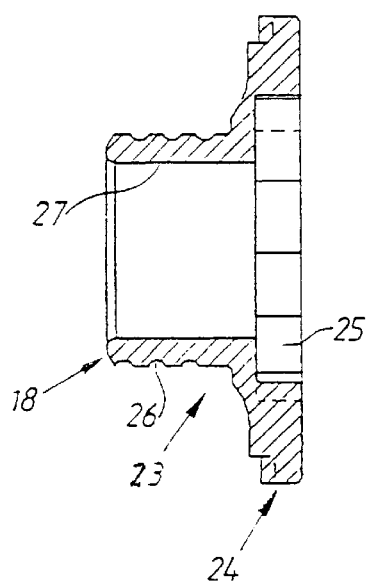
FIG. 4 a section along A—A in FIG. 2.
Figure 3:
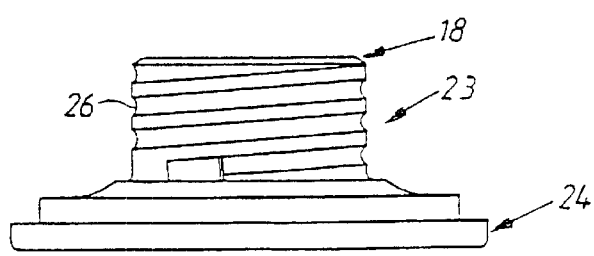
FIG. 3 a side view of the blank according to FIG. 2.

In FIGS. 2–4 a blank 23 for a worm pinion 3 according to the present invention is shown. Said blank 23 is preferably injection moulded of a plastic material, e.g. PA (polyamid) or POM (acetal). The blank 23 includes a disc shaped portion 24 and a bearing sleeve 18 integrated with said portion 24. In the disc shaped portion 24 a splines shaped recess 25 is provided, said recess 25 being intended to cooperate with the spigot 20, said spigot 20 being equipped with splines and being received in the recess 25. When the spigot 20, said spigot 20 being equipped with splines, rotates the blank 23 and consequently the entire worm pinion 3 will rotate.

At the outside of the bearing sleeve 18 a spirally shaped groove 26 is provided, said groove 26 extending from the free end of the sleeve 18 to the connection of the sleeve 18 to the disc shaped portion 24. Said groove 26 is shaped in connection with injection moulding of the blank 23, the consequence of this being that the groove 26 may be given an exact pitch. The inner side 27 of the bearing sleeve 18 is shaped as a cylindrical, in cross-section circular, sliding bearing surface that according to what has been said above abuts directly against the spigot 17 of the crankshaft 13. In connection therewith it might be suitable to mix lubricant into the plastic material that the blank 23 is manufactured from in order to facilitate the rotation of the worm pinion 3 on the shaft extension 17.

Figure 5:
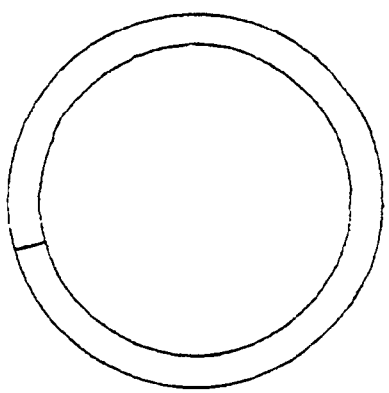
FIG. 5 an end view of a spirally wound spring wire that is included in the worm pinion according to the present invention.
Figure 6:
FIG. 6 a partly sectioned side view of the spring wire according to FIG. 5.

In FIGS. 5 and 6 a spirally wound spring wire 28 of metallic material, e.g. spring steel, is shown. The spirally wound spring wire 28 is preferably manufactured according to conventional manufacturing technique of helical springs.

Figure 7:
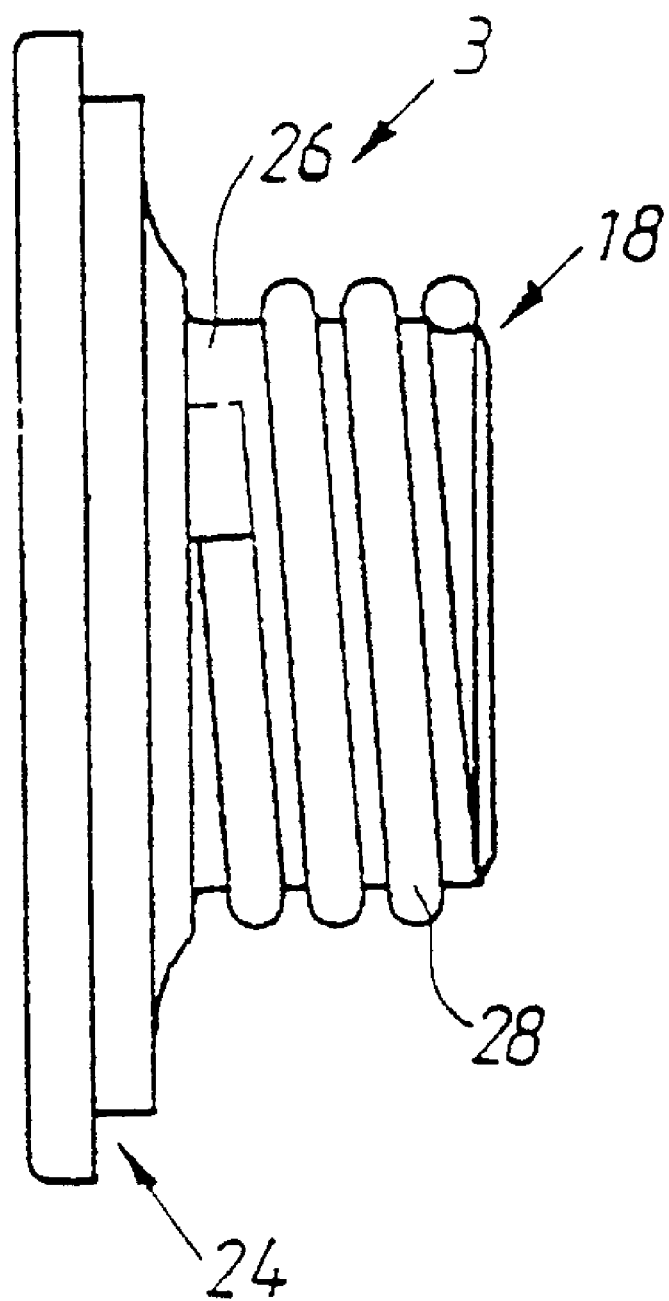
FIG. 7 a side view of an embodiment of a worm pinion according to the present invention.

In FIG. 7 the worm pinion 3 according to the present invention is shown, i.e. the spirally wound spring wire 28 has been mounted upon the sleeve 18 of the blank 23, said spirally wound spring wire 28 being screwed upon the sleeve 18. By this the spring wire 28 will be received in the groove 26 on the outer side of the bearing sleeve 18. When one end of the spring wire 28 has reached the end of the groove 26, i.e. where the groove 26 connects with the disc shape portion 24, the spring wire 28 is properly mounted on the bearing sleeve 18. Normally there is no need for any further anchoring of the spring wire in the groove 26. In this connection it should be mentioned that the spring wire 28 has such a feature that when it is threaded upon the sleeve it tends to "open", i.e. its diameter will increase but if it is desired to unthread the spring wire it will "pinch" around the sleeve 18. This is a further reason that there is no need for any special anchoring of the spirally wound spring wire 28 on the bearing sleeve 18. When mounting the spring wire 28 upon the sleeve 18 the spring wire 28 will adapt to the groove 26 of the sleeve 18, i.e. the spring wire 28 receives the pitch of the groove 26. The bearing sleeve 18 functions together with the external spring wire 28 as a helicoidal pinion.

The function of the device according to the invention will now be described with reference to FIG. 1. It is assumed that the engine is running, i.e. that the crankshaft 13 rotates. When the engine is in idling mode, i.e. the crankshaft rotates at relatively low speed, the clutch 16 rotates but not the clutch drum 15. The reason for this is that blocks of the clutch 16 are urged outwardly to engage the clutch drum 15 only when the speed of rotation of the crankshaft 13 exceeds a certain predetermined value. When the speed of rotation of the crankshaft 13 is brought to increase and said predetermined value is exceeded the blocks of the clutch 16 will be displaced outwardly into engagement with the clutch drum 15 that is thereby driven. The clutch drum 15 will drive the worm pinion 3, via the cooperation of the spigot 20, said spigot 20 being equipped with splines, with the recess 25, and the spirally shaped spring wire 28, see FIG. 7, will cooperate with the gear pinion 10 and cause it to rotate. Due to the design of the groove 11 and its cooperation with the spigot 12 the piston 9 will be given a reciprocating motion in its longitudinal direction, said motion on one hand sucks lubricant into the pumping house 7 and on the other hand pumps lubricant out of the pumping house 7 in order to supply it to the chain, said arrangement not being shown in FIG. 1.

By having the spirally wound spring wire 28 of metal to cooperate with the gear pinion 10 of plastic a sufficient strength of the pumping device for lubrication of the chain is achieved simultaneously as a considerably cheaper structural solution is achieved by having said spring wire 28 attached to a blank 23 of plastic.

In its most general concept the worm pinion according to the present invention includes a spirally shaped, prefabricated element that is received upon a support body that in the description above constitutes the blank 23. In connection with the embodiment described above the spirally shaped element constitutes a spirally wound spring wire of for instance spring steel. In exemplifying and non-restricting purpose it should be mentioned that the spirally shaped element alternatively may be made out of brass, bronze or plastic material, in the last mentioned case the spirally shaped element may be manufactured by extrusion. It is preferred if the spirally shaped element is manufactured from a heat conductive material. In this connection it should be pointed out that the cross section of the wire does not need to be circular and in exemplifying and non-restricting purpose triangular or square cross section may be mentioned. In case the support body is provided with a groove in order to receive the spirally shaped element there should be an adaptation of the cross section of the groove to the cross section of the wire.

The support body/blank may be manufactured in several ways and from a number of materials, in exemplifying and non-restricting purpose it may be mentioned that the support body/the blank may be manufactured out of sintered metal powder, by casting in for instance alloys of zinc, bronze, aluminium, by metal cutting, e.g. turning, e.g. in steel, bronze or brass, in polymer materials, by e.g. injection moulding. As regards injection moulding it is feasible within the scope of the invention to have the prefabricated spirally shaped element placed in the injection moulding tool for the support body/the blank and that in connection with the injection moulding the spirally shaped element is connected with the support body/the blank.

In connection with the embodiment according to FIG. 1 the reciprocating motion of the piston 9 is effected by having a groove 11 to cooperate with a pin 12. Other structural solutions to effect said reciprocating motion are possible within the scope of the present invention, and in exemplifying and non-restricting purpose it may be mentioned that the free end of the piston may be bevelled, said bevelled end is brought to cooperate with a stationary abutment, said bevelling generating a reciprocating motion of the piston when it rotates.

The spigot 20, said spigot 20 being equipped with splines, and the cooperating splines shaped recess 25 may of course be designed in several ways within the scope of the invention, however driving must be present when they are in engagement with each other.

What is claimed is:

1. Pumping device (1) in connection with saw chain lubrication, in connection with a hand-held chain saw, said pumping device (1) including a pumping house (7), a piston (9) that is received in the pumping house (7) and means (3, 10, 11, 12) to bring the piston (9) to rotate and simultaneously perform a reciprocating motion in its longitudinal direction, said means including on one hand a worm pinion (3) having means (25) for driving cooperation with a prime mover (15, 19) and on the other hand a gear pinion (10) mounted on the piston (9), characterized in that said worm pinion (3) on one hand includes a spirally shaped element (28) that is prefabricated as a separate detail and intended to cooperate with the gear pinion (10), and on the other hand a sleeve shaped element (18) that supports the spirally shaped element (28), and that the spirally shaped element (28) is manufactured from a metal, and that the sleeve shaped element (18) and the teeth of the pinion (10) are manufactured from a polymer material, and that the sleeve shaped element constitutes a bearing sleeve (18) having a spirally shaped groove (26) on an outer side that receives the spirally shaped element (28).

2. Pumping device (1) according to claim 1, characterized in that said worm pinion (3) includes a disc shaped portion (24) integrated with the sleeve shaped element (18).

3. Pumping device (1) according to claim 1, characterized in that the spirally shaped element constitutes a spirally shaped wire (28).

4. Pumping device (1) according to claim 1, characterized in that the spirally shaped element (28) is manufactured from spring steel.

5. Pumping device (1) according to claim 1, characterized in that the sleeve shaped element (18) is manufactured from a plastic material comprising one of PA (polyamide) and POM (acetal).

* * * * *